(12) United States Patent
Yang et al.

(10) Patent No.: US 10,082,844 B2
(45) Date of Patent: Sep. 25, 2018

(54) SLIM TYPE OF SCREWLESS REMOVABLE HARD DRIVE TRAY

(71) Applicant: Super Micro Computer Inc., San Jose, CA (US)

(72) Inventors: Jerry C. Yang, San Jose, CA (US); Lawrence H. Liang, San Jose, CA (US); Richard S. Chen, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 15/493,144

(22) Filed: Apr. 21, 2017

(65) Prior Publication Data

US 2018/0226106 A1 Aug. 9, 2018

(30) Foreign Application Priority Data

Feb. 7, 2017 (TW) .............................. 106201814 U

(51) Int. Cl.
| | |
|---|---|
| *G06F 1/16* | (2006.01) |
| *G06F 1/18* | (2006.01) |
| *G11B 33/12* | (2006.01) |
| *G11B 33/06* | (2006.01) |
| *G11B 33/14* | (2006.01) |

(52) U.S. Cl.
CPC .............. *G06F 1/187* (2013.01); *G11B 33/06* (2013.01); *G11B 33/124* (2013.01); *G11B 33/142* (2013.01); *G11B 33/1493* (2013.01)

(58) Field of Classification Search
CPC ...................................................... G06F 1/187
USPC .... 361/726, 679.33–679.36, 679.38–679.39, 361/679.33–679.39; 312/223.1, 223.2; 211/26
See application file for complete search history.

(56) References Cited

U.S. PATENT DOCUMENTS

| | | | | |
|---|---|---|---|---|
| 5,683,159 | A * | 11/1997 | Johnson ................... | G06F 1/184 312/223.2 |
| 6,473,300 | B1 * | 10/2002 | Youngquist .......... | G11B 33/125 359/350 |
| 6,683,785 | B1 * | 1/2004 | Chen ..................... | G11B 33/124 312/332.1 |
| 6,728,109 | B1 * | 4/2004 | Wu ......................... | G06F 1/181 361/679.36 |
| 7,554,811 | B2 * | 6/2009 | Scicluna ................. | G06F 1/184 312/223.1 |
| 8,300,398 | B2 * | 10/2012 | Zhang ..................... | G06F 1/187 312/223.2 |
| 8,480,039 | B2 * | 7/2013 | Chang .................. | G11B 33/124 248/27.1 |

(Continued)

*Primary Examiner* — Nidhi Thaker
(74) *Attorney, Agent, or Firm* — Chun-Ming Shih; HDLS IPR Services

(57) ABSTRACT

A removable hard drive tray includes a seat, a coupling plate and a coupling arm. The seat includes a bottom plate, a first side plate and a second side plate. The first side plate has a through hole. The coupling plate is disposed in an outer side of the first side plate and has a hollow slot. The coupling arm has a pivot end and a free end. The pivot end is pivoted in the hollow slot, and the free end has a latch. The free end rotates to the hollow slot and passes the through hole. Thus the hard drive is combined in the accommodating space by an engagement of the latch and the fastening hole.

9 Claims, 10 Drawing Sheets

(56) References Cited

U.S. PATENT DOCUMENTS

| 9,383,784 B2* | 7/2016 | Lo ............................. G06F 1/187 |
| 2009/0167124 A1* | 7/2009 | Lee ........................ G06F 1/187 |
| | | 312/223.2 |

* cited by examiner

US 10,082,844 B2

SLIM TYPE OF SCREWLESS REMOVABLE HARD DRIVE TRAY

BACKGROUND OF THE INVENTION

Field of the Invention

The present invention generally relates to a hard drive tray and, more particular to, a screwless removable hard drive tray.

Description of Prior Art

At present, removable hard drive trays are usually adopted for arranging multiple arrays of storage devices in servers. Generally speaking, removable hard drive trays are usually needed to be pre-secured in a frame, and then the frame will be combined to the chassis. In addition, traditional removable hard drive trays and the frames are secured with a large number of screws for locking. Hence, the assembly is time-consuming and the production is slow; besides, the purchase of screws also gets an increase of production cost.

Moreover, when hard drives in a server are replaced often or the amount of the hard drives is large, it is time consuming of locking screws. Furthermore, the processes of disassembly and assembly need use of hand tools will result in inconvenient and troublesome. Therefore, it is necessary to be improved.

In view of the above drawbacks, the Inventor proposes the present invention based on his expert knowledge and elaborate researches in order to solve the problems of prior art.

SUMMARY OF THE INVENTION

Accordingly, an object of the present invention is to provide a slim type of screwless removable hard drive tray for securing the hard drive without using screws as to increase convenience of using.

In order to achieve the object mentioned above, the present invention provides a slim type of screwless removable hard drive tray for combining a hard drive with at least one fastening hole including a seat, a coupling plate and at least one coupling arm. The seat includes a bottom plate, a first side plate and a second side plate connecting with the bottom plate. The bottom plate, the first side plate and the second side plate are enclosed for forming an accommodating space. The hard drive is put in the accommodating space, and the first side plate has at least one through hole. The coupling plate is disposed in an outer side of the first side plate and has at least one hollow slot located corresponding to the through hole. The coupling arm has a pivot end and a free end oppositely. The pivot end is pivoted in the hollow slot, and the free end has a latch. The free end is capable of rotating to the hollow slot and passing the through hole. Thus the hard drive is combined in the accommodating space by an engagement of the latch and the fastening hole.

Comparing to the prior art, the slim type of screwless removable hard drive tray of the present invention has made one side of the hard drive abut against one side of the side plate through a positioning of the positioning hole and the positioning pin; moreover, the positioning of another side of the hard drive is accomplished by the through hole of the side plate, the coupling plate and the coupling arm, wherein the coupling arm is rotated to the seat from an outer side of the coupling arm, and the hard drive is combined in the accommodating space by the latch and the fastening hole. Thereby, the hard drive can be steadily combined in the accommodating space. As screws and hand tools are not necessary in the assembly, a complicated assembly process can be avoided and convenience will be increased.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
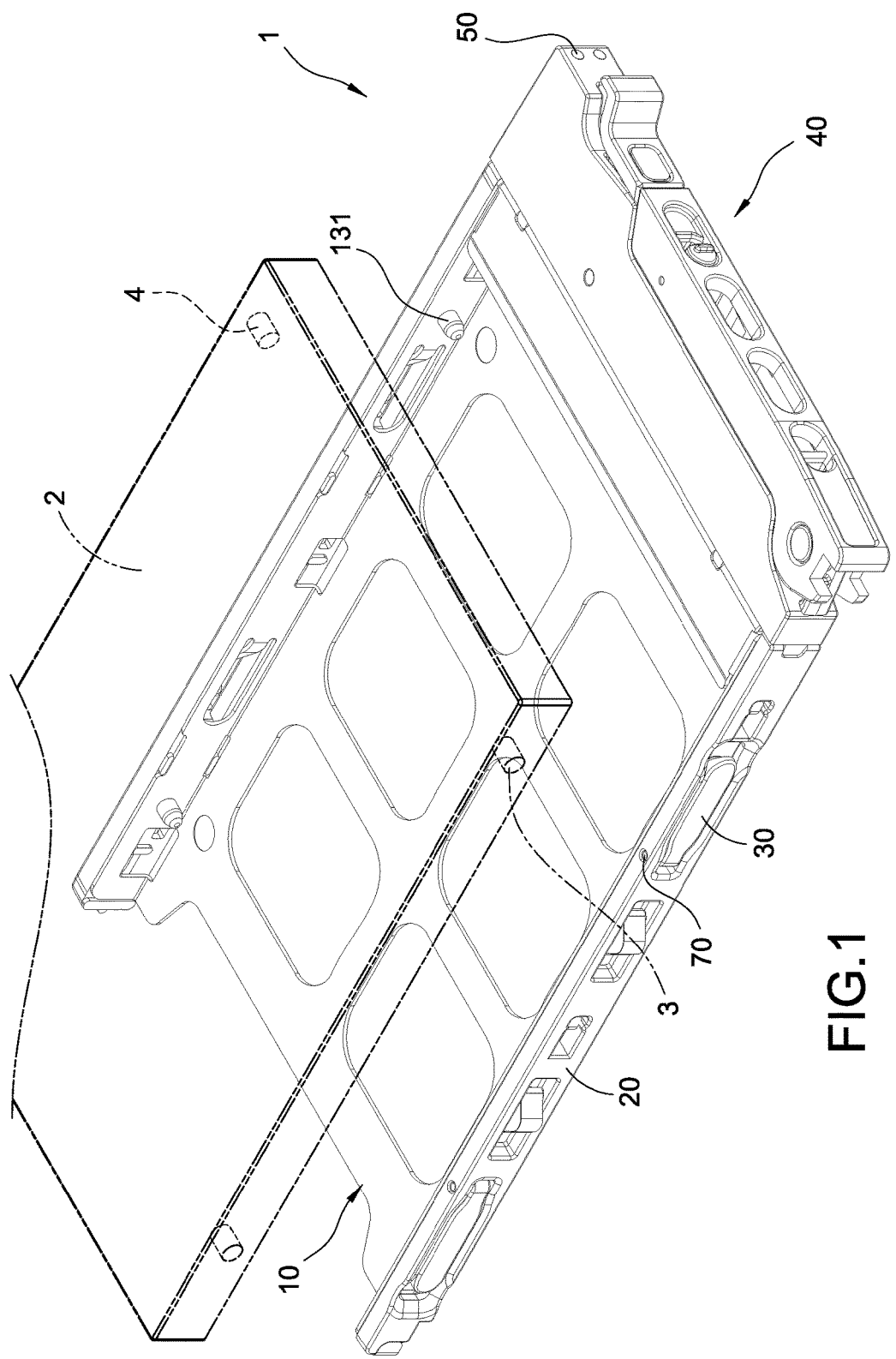
FIG. 1 is a perspective schematic view of the slim type of screwless removable hard drive tray of the present invention.
Figure 2:
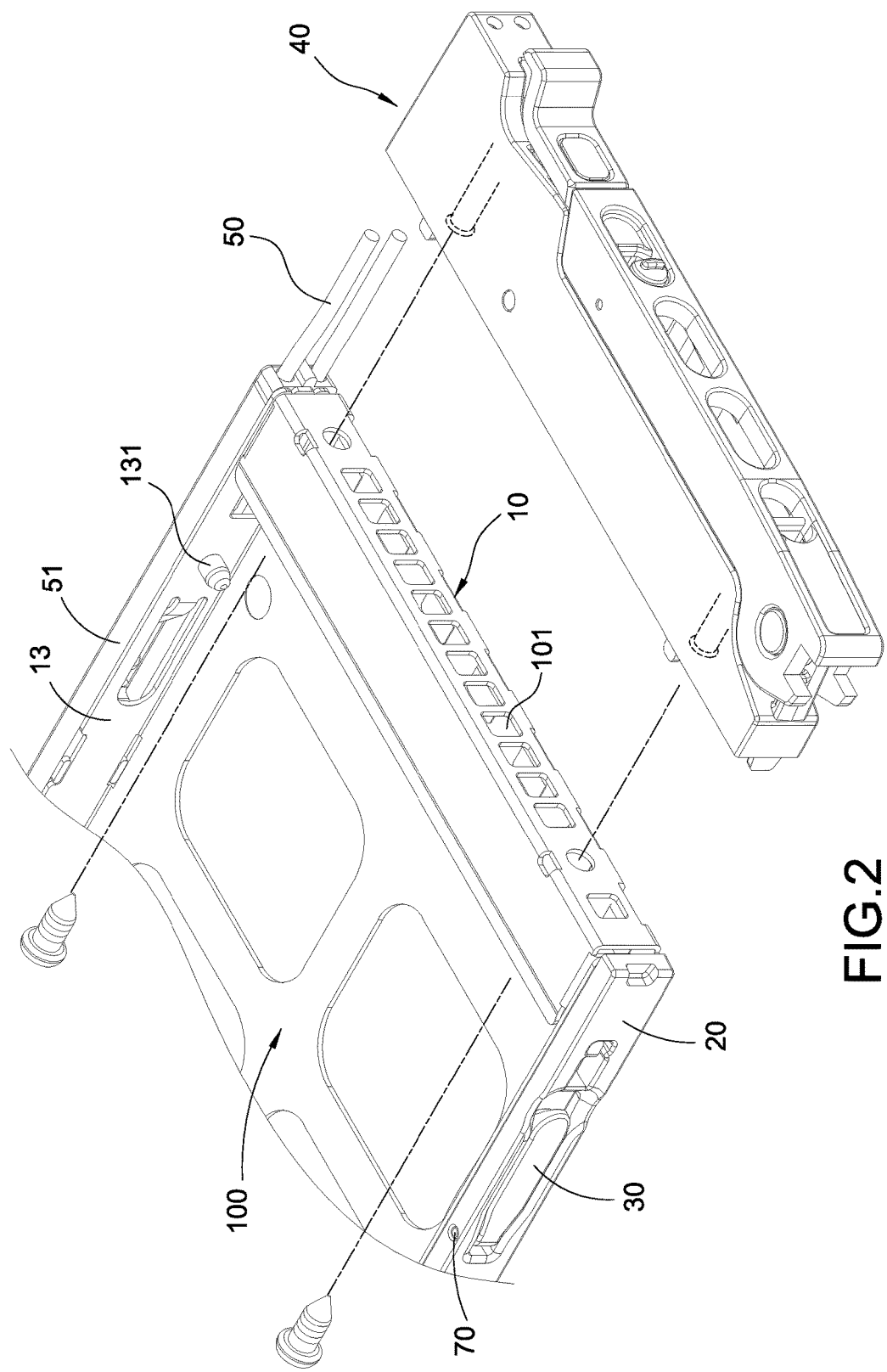
FIG. 2 is a perspective explosion schematic view of the handle structure and the seat of the present invention.
Figure 6:
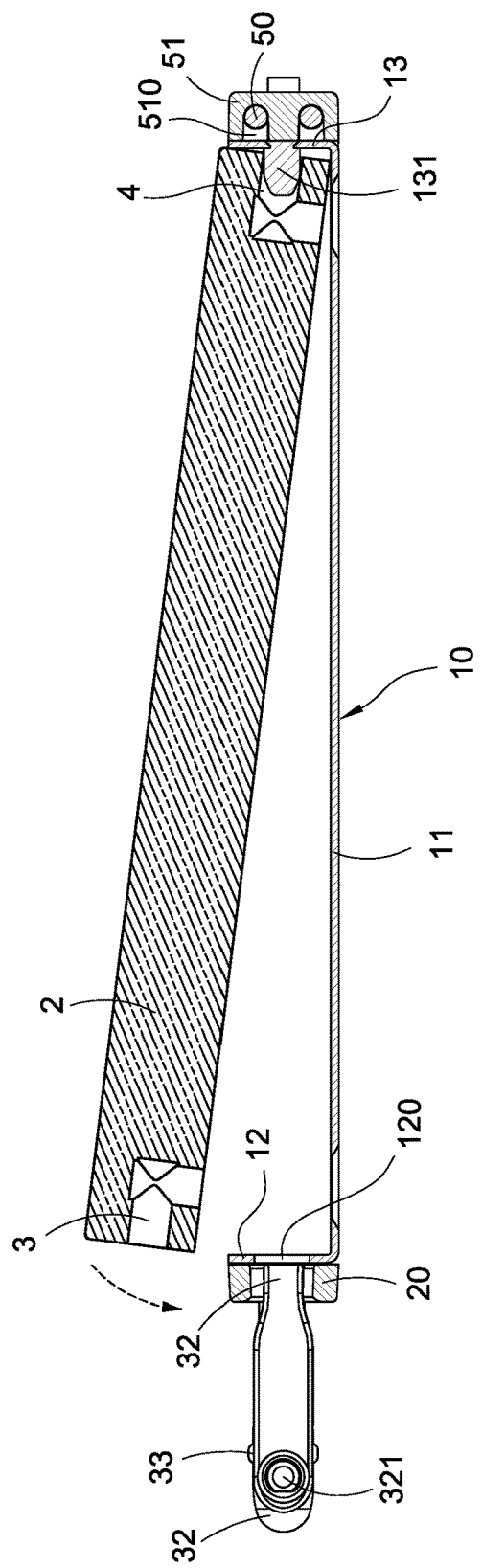
FIG. 6 is an operating schematic view of the hard drive while disposing in the seat of the present invention.

Please refer to FIG. 1 and FIG. 2, they depict a perspective schematic view of the slim type of screwless removable hard drive tray and a perspective explosion schematic view of the handle structure and the seat of the present invention. The present invention provides a slim type of screwless removable hard drive tray 1. The slim type of screwless removable hard drive tray 1 includes a seat 10, a coupling plate 20, at least one coupling arm 30 and a handle structure 40. The coupling plate 20 is disposed in a side of the seat 10. The coupling arm 30 is connected with the coupling plate 20 for positioning a hard drive 2 having at least one fastening hole 3 (as shown in FIG. 6). The handle structure 40 is combined in a front side of the seat 10 for exerting a force on the seat 10 and extracting the seat 10. The structure of the screwless removable hard drive tray 1 is described in more detail as following.

Figure 3:
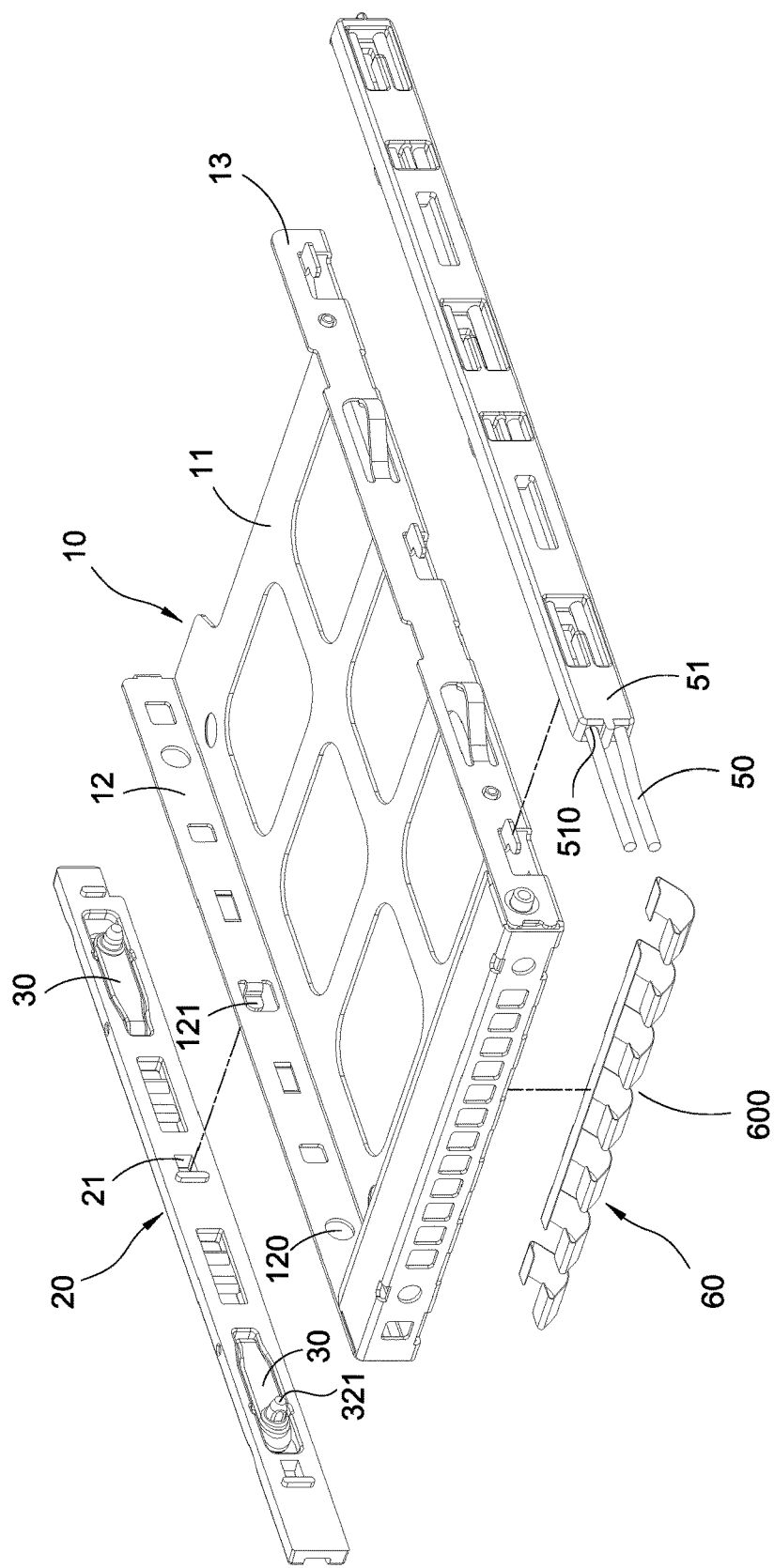
FIG. 3 is a perspective partial explosion schematic view of the slim type of screwless removable hard drive tray of the present invention.
Figure 4:
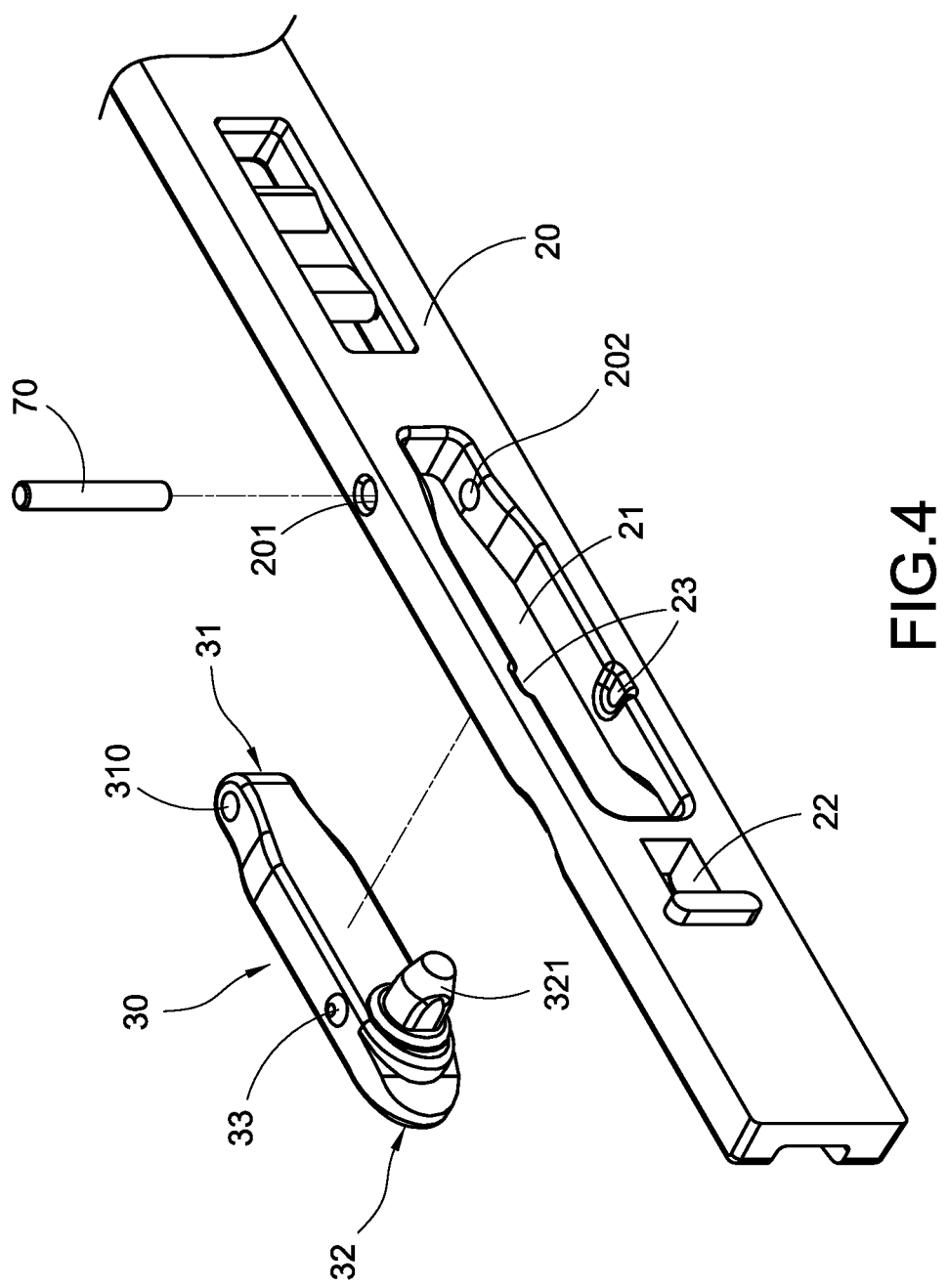
FIG. 4 is a perspective explosion schematic view of the coupling plate and the coupling arm of the present invention.
Figure 5:
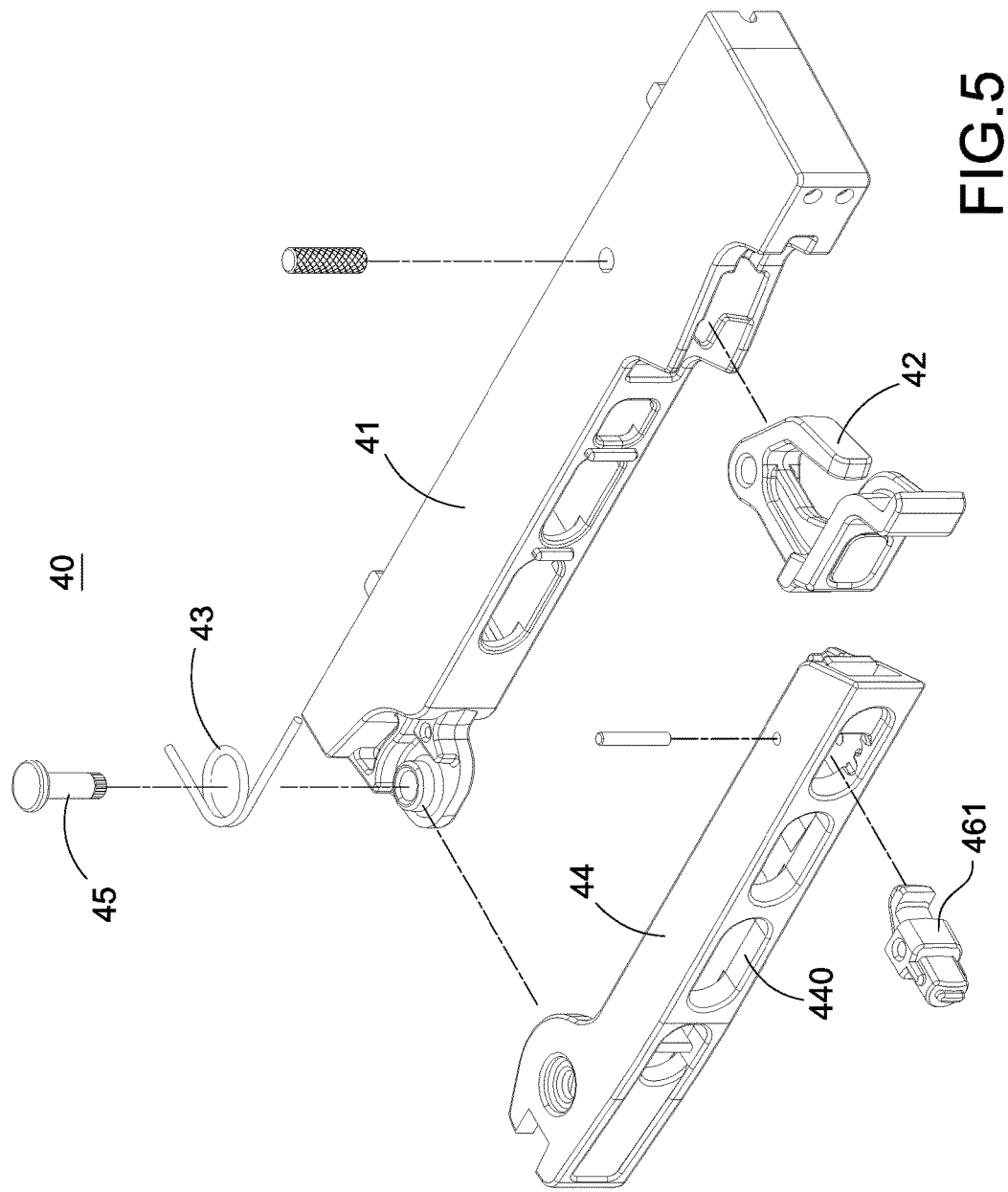
FIG. 5 is a perspective explosion schematic view of the handle structure of the present invention.

With further referring to FIG. 3 to FIG. 5, they depict a perspective partial explosion schematic view of the slim type of screwless removable hard drive tray, a perspective explosion schematic view of the coupling plate and the coupling arm and a perspective explosion schematic view of the handle structure of the present invention. In the present embodiment, the seat 10 includes a bottom plate 11, a first side plate 12 and a second side plate 13 connecting with the bottom plate 11. The bottom plate 11, the first side plate 12 and the second side plate 13 are enclosed for forming an accommodating space 100. The hard drive 2 is installed in the accommodating space 100. Moreover, the seat 10 has a plurality of heat dissipating holes 101 in a side facing the handle structure 40, and the first side plate 12 has at least one through hole 120.

The coupling plate 20 is disposed in an outer side of the first side plate 12 and has at least one hollow slot 21 located corresponding to the through hole 120. Besides, the coupling arm 30 has a pivot end 31 and a free end 32 oppositely. The pivot end 31 is pivoted in the hollow slot 21 of the coupling plate 20. The free end 32 has a latch 321, and the free end 32 is capable of rotating to the hollow slot 21 from an outer side of the coupling plate 20 (the first side plate 12) and passing the through hole 120 by the rotating of the pivot end 31.

As shown in FIG. 3, in an embodiment of the present invention, the first side plate 12 a hook 121 protruding toward outside thereof; besides, the coupling plate 20 has provided with a hook hole 22 correspondingly. The coupling plate 20 is combined with the first side plate 12 through the hook 121 clamped in the hook hole 22.

In an embodiment of the present invention, the slim type of screwless removable hard drive tray 1 further includes a plurality of light guiding elements 50 for providing information (ex. glowing while in operation) and a supporting plate 51. The supporting plate 51 having a plurality of grooves 510 is combined in an outer side of the second side plate 13. In addition, the light guiding elements 50 are disposed in the grooves 510, and one end of the light guiding element 50 is exposed the handle structure 40 (as shown in FIG. 1). Besides, the slim type of screwless removable hard drive tray 1 further includes an EMI shrapnel 60. The EMI shrapnel 60 is disposed between the seat 10 and the handle structure 40 and has a plurality of vents 600 on a side facing the accommodating space 100. The EMI shrapnel 60 is used to provide an EMI effect for the hard drive 2.

More specifically, one side of the hard drive 2 of the present invention has two fastening holes 3. The first side plate 12 has two through holes 120 disposed at two ends of the first side plates 12. Besides, the coupling plate 20 has two hollow slots 21 corresponding to the two through holes 121. The quantity of the coupling arm 30 is two for corresponding with the quantity of the hollow slots 21, and the free ends 32 of the two coupling arms 30 are disposed in a direction away from each other. When two coupling arm 30 are rotated to the accommodating space 100, the latch 321 located at the free end 32 will be inserted in the fastening hole 3 of the hard drive 2.

Please refer to FIG. 4. In the present embodiment, the slim type of screwless removable hard drive tray 1 further includes a pivot axis 70. The coupling plate 20 has a first pivot hole 201 and a second pivot hole 202 locating at opposite sides of the hollow slot 21. The pivot end 31 of the coupling arm 30 has a shaft hole 310, and the pivot axis 70 passes the first pivot hole 201, the shaft hole 310 and the second pivot hole 202 sequentially and is actively connected in the hollow slot 21.

Preferably, each of the two opposite sides of the coupling arm 30 has a bump 33, and the coupling plate 20 has a recess 23 at two walls of the hollow slot 21 separately. The bump 33 of the coupling arm 30 is positioned at the recess 23 when the free end 32 is rotated to the hollow slot 21.

With referring to FIG. 5. In an embodiment of the present invention, the hand structure 40 includes a pivot seat 41, a pressing element 42, a torsion spring 43, a handle 44 and a plurality of pivot shafts 45. One end of the handle 44 is pivoted in a side of the pivot seat 41 by the pivot shaft 45 and the torsion spring 43, and the handle 44 has a hollow portion 440. The pressing element 42 is pivoted in another side of the pivot seat 41 so that it can block the other end of the handle 44 through the rotating.

Preferably, the handle structure 40 further includes a lock assembly 46. The lock assembly 46 includes a locking piece 461 pivoted on the handle 44 and a blocking plate 462 disposed on the pivot seat 41. The handle 44 is positioned in a side of the pivot seat 41 through an engagement of the locking piece 461 and the blocking plate 462). Thereby, when the lock assembly 46 is in locked state (the locking piece 461 engaged with the blocking plate 462), the handle 44 cannot rotate out of the pivot seat 41.

Figure 7:
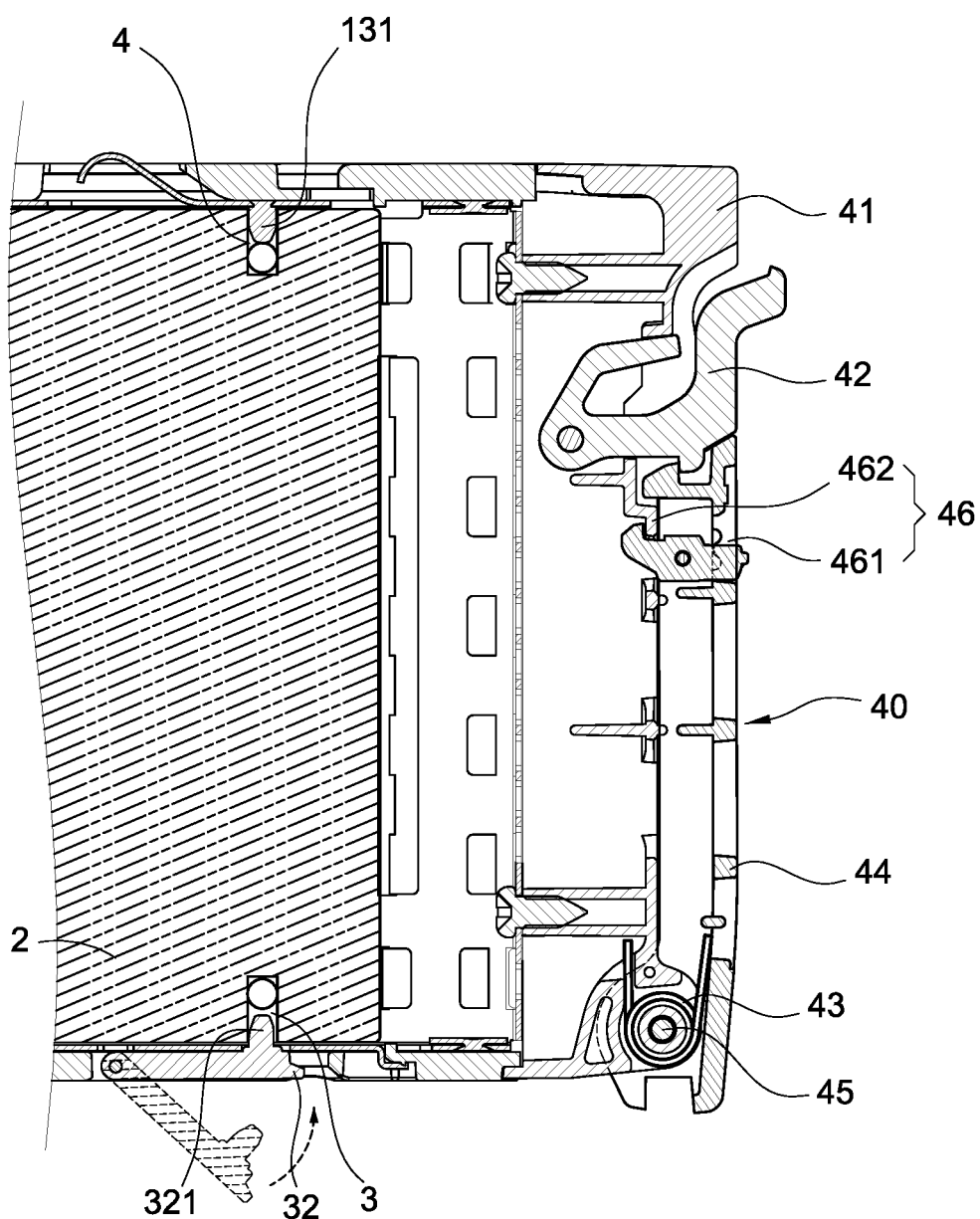
FIG. 7 is an operating schematic view of the coupling arm of the present invention.
Figure 8:
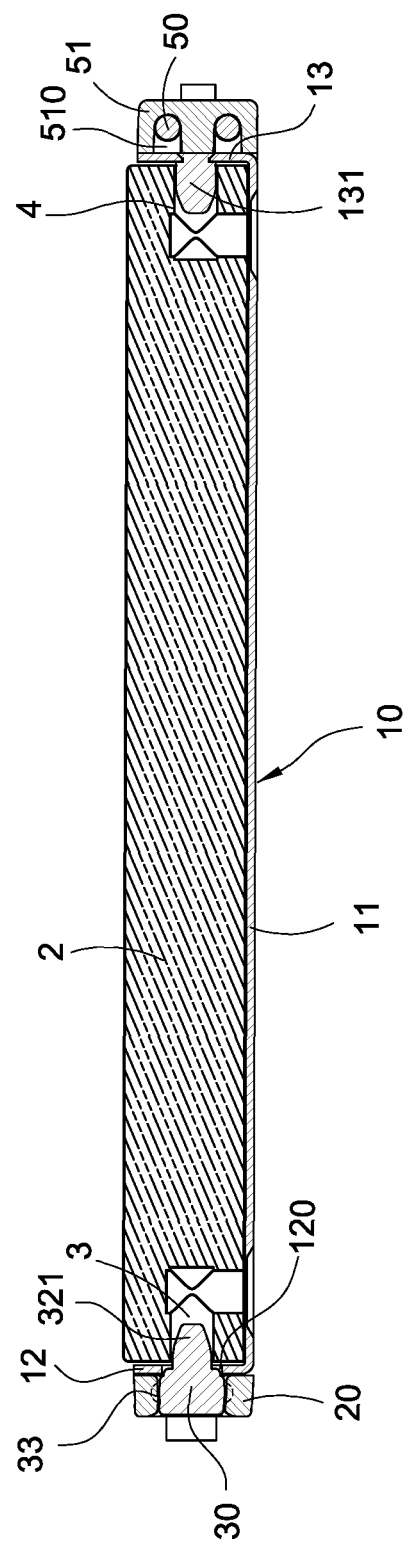
FIG. 8 is a cross sectional view of the hard drive after positioning of the present invention.

Please further refer to FIG. 6 to FIG. 8, they depict an operating schematic view of the hard drive disposing in the seat, an operating schematic view of the coupling arm and a cross sectional view of the hard drive after positioning of the present invention. As shown in FIG. 6, in the present embodiment, the hard drive 2 has at least one positioning hole 4 in a side facing the second side plate 13. Moreover, the second side plate 13 has at least one positioning pin 131 corresponding to the positioning hole 4. The hard drive 2 abuts against on a side of the second side plate 13 through an alignment of the positioning hole 4 and the positioning pin 131. Thereby, when the hard drive 2 is inserted to the seat 10, one side of the hard drive 2 abuts against the second side plate 13 firstly, and let the positioning hole 4 align with the positioning pin 131. Thus, another side of the hard drive 2 can be inserted to the accommodating space 100 of the seat 10 laterally.

Please refer to FIG. 7, after the hard drive 2 is disposed in the accommodating space 100 of the seat 10, then the coupling arm 30 rotates to the accommodating space 100. Now, the latch 321 located at the free end 32 will be inserted to the fastening hole 3 of the hard drive 2. Thereby, the hard drive 2 will be combined in the accommodating space 100 by the engagement of the latch 321 and the fastening hole 3.

It is worthy of notice that, one end of the handle 44 has an elastic restoring force by the torsion spring 43 when rotates. Besides, when the handle 44 is not in use, it can be placed on one side of the pivot seat 41 in a direction parallel to the pivot seat 41 by a pressing of the pressing element 42. In the meantime, the lock assembly 46 needs to be unlocked, and the locking piece 461 must be pressed to apart from the blocking plate 462; thus the handle 44 can be rotated out of the pivot seat 41.

Another thing worthy of notice is that, in the present embodiment, an external airflow flows from the hollow slot 440 of the handle 44 and passes through the handle 44 and the EMI shrapnel 60. At last, the external airflow will pass the vents 600 of the EMI shrapnel 60 and the heat dissipating holes 101 of the seat 10 for dissipating heat of the hard drive 2.

In summary, as shown in FIG. 8, one side of the hard drive 2 abuts against on one side of the second side plate 13 through an alignment of the positioning hole 4 and the positioning pin 131. Moreover, another side of the hard drive 2 is positioned through an engagement of the latch 321 and the fastening hole 3. Thereby, the hard drive 2 can be steadily combined in the accommodating space 100.

Figure 9:
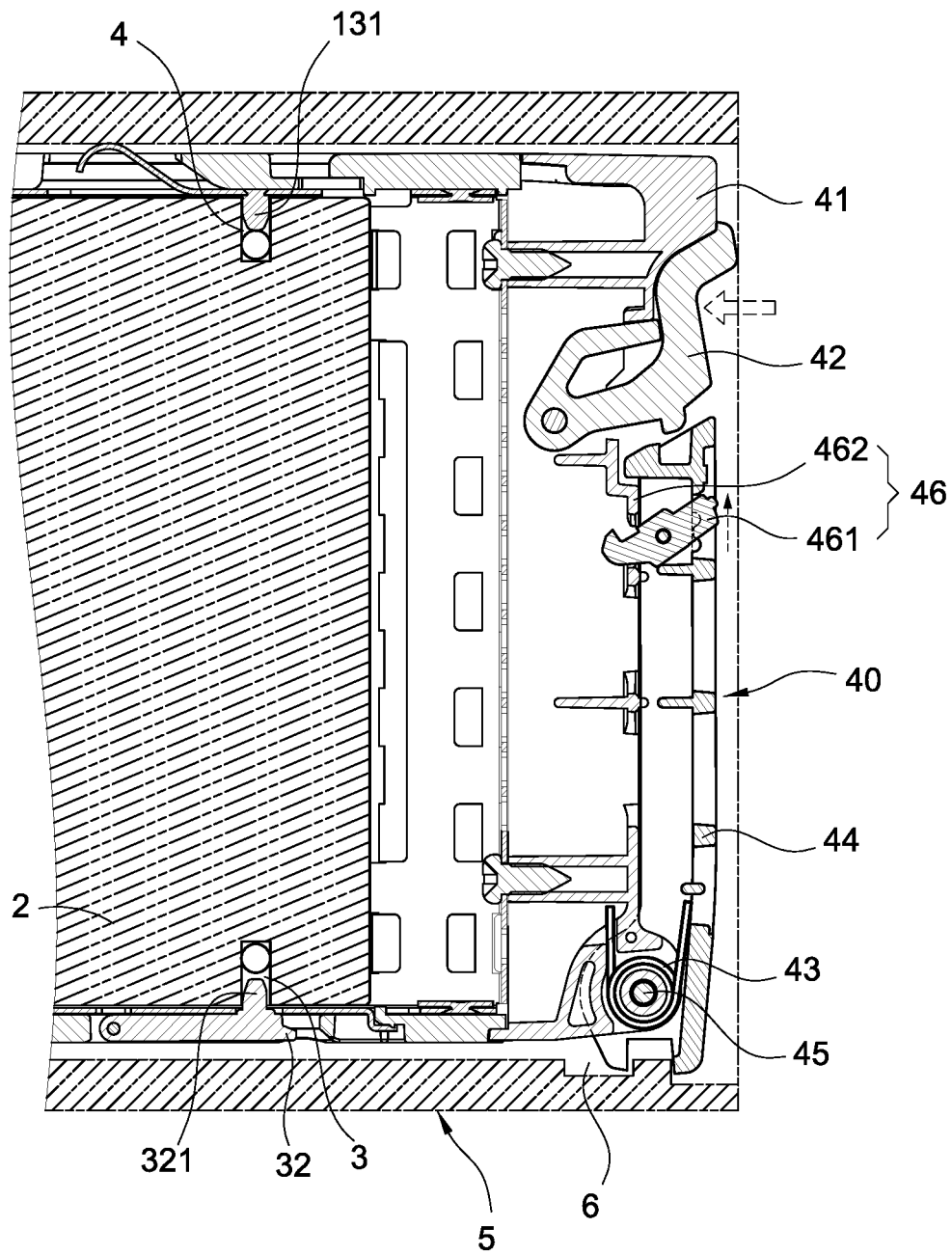
FIG. 9 is an opening schematic view of the handle structure of the present invention.
Figure 10:
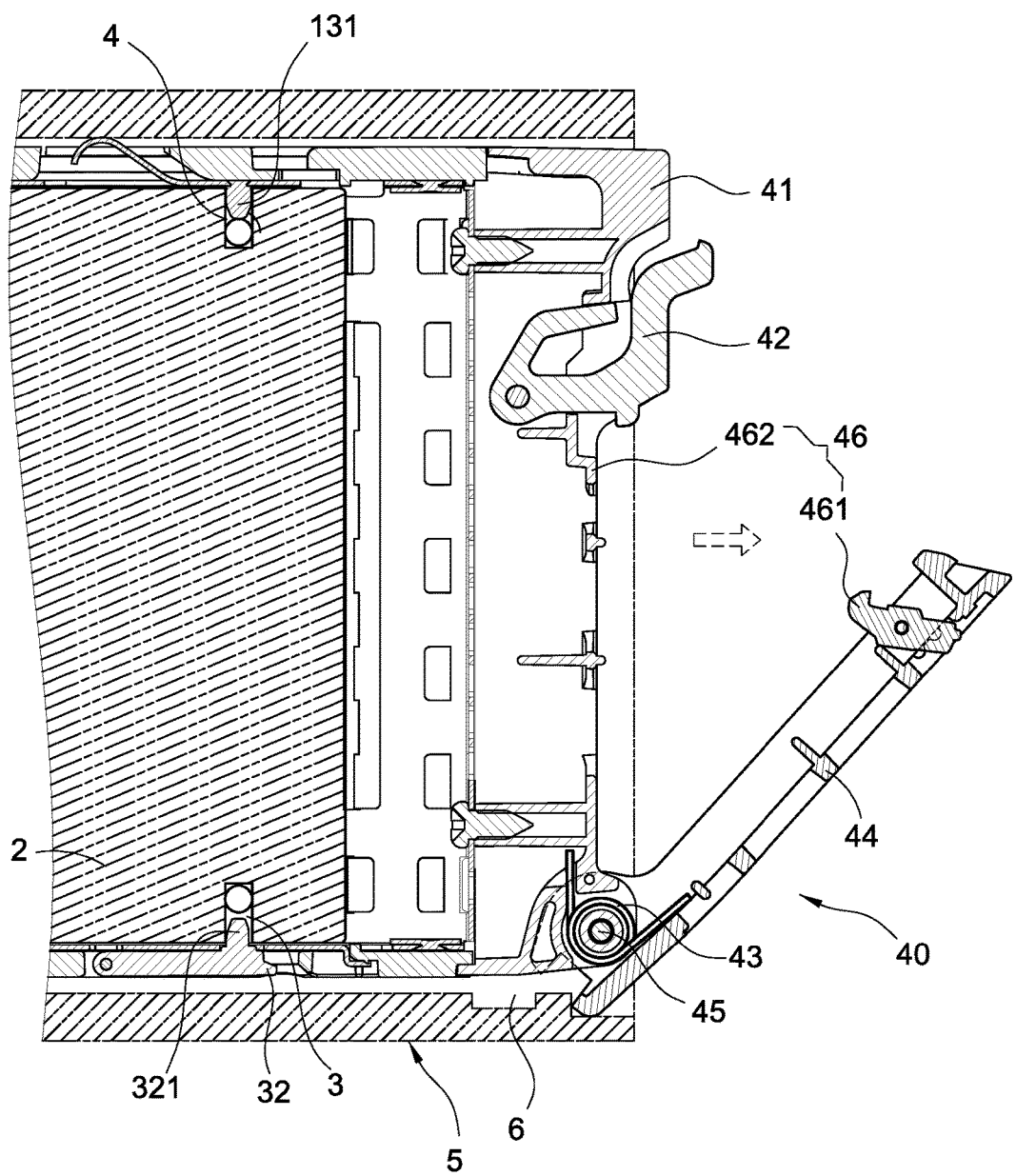
FIG. 10 is a rotating schematic view of the handle of the present invention.

Please refer to FIG. 9 and FIG. 10, they depict an opening schematic view of the handle structure and a rotating schematic view of the handle of the present invention. In the present embodiment, when the lock assembly 46 is in unlock status and the handle 44 is not blocked by the pressing element 42, the handle 44 will be rotated away from the pivot seat 41 by the elastic restoring force of the torsion spring 43.

It is worth of notice that, the slim type of screwless removable hard drive tray 1 is combined in a chassis 5; besides, the chassis 5 has a concave portion 6 corresponding to an end of the handle 44. When the handle structure 40 is rotated to close, one end of the handle 44 will be positioned in the concave portion 6. On the other hand, when the handle structure 40 is rotated to open, one end of the handle 44 will be rotated away from the concave portion 6. Thus, the slim type of screwless removable hard drive tray 1 can be avoided from taking out of the chassis 5 when in use.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A slim type of screwless removable hard drive tray for combining a hard drive with at least one fastening hole, including:
    a seat including a bottom plate, a first side plate and a second side plate connecting with the bottom plate; the bottom plate, the first side plate and the second side plate being enclosed for forming an accommodating space, and the hard drive being disposed in the accommodating space; the first side plate having at least one through hole;
    a coupling plate disposed at an outer side of the first side plate and having at least one hollow slot located corresponding with the through hole; and
    at least one coupling arm having a pivot end and a free end oppositely; the pivot end being pivoted in the hollow slot, and the free end having a latch; the free end being capable of rotating to the hollow slot and passing the through hole, and thus the hard drive being engaged in the accommodating space by an engagement of the latch and the fastening hole,
    wherein each of two opposite walls of the hollow slot has a recess and each of two opposite sides of the coupling arm has a bump that is positioned at one of the two recesses when the free end is rotated to the hollow slot.

2. The slim type of screwless removable hard drive tray according to claim 1, further including a pivot axis, wherein the coupling plate has a first pivot hole and a second pivot hole locating at opposite sides of the hollow slot; the pivot end of the coupling arm has a shaft hole, and the pivot axis passes the first pivot hole, the shaft hole, and the second pivot sequentially and is actively connected in the hollow slot.

3. The slim type of screwless removable hard drive tray according to claim 1, wherein the first side plate has a hook protruding toward outside thereof, and the coupling plate is provided with a hook hole correspondingly; the coupling plate is combined with the first side plate through the hook clamped in the hook hole.

4. The slim type of screwless removable hard drive tray according to claim 1, wherein the hard drive has at least one positioning hole, and the second side plate has at least one positioning pin corresponding to the positioning hole; the hard drive abuts against the second side plate through an alignment of the positioning hole and the positioning pin.

5. The slim type of screwless removable hard drive tray according to claim 1, wherein one side of the hard drive has two fastening holes, and the first side plate has two through holes disposed at two sides thereof; the coupling plate has two hollow slots corresponding to the two through holes, and the quantity of the coupling arm is two for corresponding with the quantity of the hollow slots; the free ends of the two coupling arms are disposed in a direction away from each other.

6. The slim type of screwless removable hard drive tray according to claim 1, further including a plurality of light guiding elements and a supporting plate, wherein the supporting plate has a plurality of grooves, and the light guiding elements are disposed in the grooves.

7. The slim type of screwless removable hard drive tray according to claim 1, further including a handle structure combined with the seat, the handle structure includes a pivot seat, a pressing element, a torsion spring, a handle and a plurality of pivot shafts; one end of the handle is pivoted in a side of the pivot seat by the pivot shaft and the torsion spring, and the pressing element is pivoted in another side of the pivot seat that can block the other end of the handle through the rotating.

8. The slim type of screwless removable hard drive tray according to claim 7, further including an EMI shrapnel, wherein the EMI shrapnel is disposed between the seat and the handle and has a plurality of vents in a side facing the accommodating space; the handle has a hollow slot, and outside air flows from the hollow slot through the handle and the EMI shrapnel to pass the vents for dissipating heat of the hard drive.

9. A slim type of screwless removable hard drive tray for combining a hard drive with at least one fastening hole, including: a seat including a bottom plate, a first side plate and a second side plate connecting with the bottom plate: the bottom plate, the first side plate and the second side plate being enclosed for forming an accommodating space, and the hard drive being disposed in the accommodating space; the first side plate having at least one through hole; a coupling plate disposed at an outer side of the first side plate and having at least one hollow slot located corresponding with the through hole; at least one coupling arm having a pivot end and a free end oppositely; the pivot end being pivoted in the hollow slot, and the free end having a latch; the free end being capable of rotating to the hollow slot and passing the through hole, and thus the hard drive being engaged in the accommodating space by an engagement of the latch and the fastening hole; and a handle structure combined with the seat, the handle structure includes a pivot seat; a pressing element, a torsion spring, a handle and a plurality of pivot shafts; one end of the handle is pivoted in a side of the pivot seat by the pivot shaft and the torsion spring, and the pressing element is pivoted in another side of the pivot seat that can block the other end of the handle through the rotating; wherein the handle structure further including a lock assembly; the lock assembly includes a locking piece pivoted on the handle and a blocking plate disposed on the pivot seat; the handle is positioned in a side of the pivot seat through an engagement of the locking piece and the blocking plate.

* * * * *